(12) United States Patent
Colliou

(10) Patent No.: US 7,976,802 B2
(45) Date of Patent: Jul. 12, 2011

(54) TREATMENT PLANT FOR POLLUTANTS CONTAINED IN THE EXHAUST GAS OF AN INTERNAL-COMBUSTION ENGINE AND METHOD USING SAME

(75) Inventor: Thierry Colliou, Les Cotes d'Arey (FR)

(73) Assignee: IFP, Cedex (FR)

( * ) Notice: Subject to any disclaimer, the term of this patent is extended or adjusted under 35 U.S.C. 154(b) by 0 days.

(21) Appl. No.: 12/560,248

(22) Filed: Sep. 15, 2009

(65) Prior Publication Data

US 2010/0098609 A1    Apr. 22, 2010

(30) Foreign Application Priority Data

Sep. 15, 2008    (FR) ...................................... 08 05035

(51) Int. Cl.
*B01D 53/94* (2006.01)
*F01N 3/18* (2006.01)
*F01N 3/22* (2006.01)

(52) U.S. Cl. ..................... 423/213.2; 423/213.7; 60/299; 60/301; 60/302; 60/324

(58) Field of Classification Search ............... 423/213.2, 423/213.7; 60/299, 301, 302, 324
See application file for complete search history.

(56) References Cited

U.S. PATENT DOCUMENTS 6,152,118 A * 11/2000 Sasaki et al. ............. 123/568.21

FOREIGN PATENT DOCUMENTS

| DE | 195 29 835 A1 | 2/1997 |
| DE | 10 2005 015 479 A1 | 10/2006 |
| EP | 0 758 714 B1 | 11/1999 |
| EP | 1 602 403 A2 | 12/2005 |

OTHER PUBLICATIONS

French Search Report, FR 0805035, Jun. 25, 2009.

* cited by examiner

*Primary Examiner* — Timothy C Vanoy
(74) *Attorney, Agent, or Firm* — Antonelli, Terry, Stout & Kraus, LLP.

(57) ABSTRACT

A plant for treating pollutants contained in the exhaust gases of an internal-combustion engine includes an exhaust line (10) with an oxidation catalyst (12), a selective catalytic reduction catalyst (16) including a chemically active porous body and an injector (54) for injecting a reducing agent into the exhaust line. The selective catalytic reduction catalyst (16) includes at least one chemically inert passage (42) for the exhaust gases flowing therethrough and a shut-off (44) controlling access of the gases to the passage.

19 Claims, 1 Drawing Sheet

TREATMENT PLANT FOR POLLUTANTS CONTAINED IN THE EXHAUST GAS OF AN INTERNAL-COMBUSTION ENGINE AND METHOD USING SAME

FIELD OF THE INVENTION

The present invention relates to a plant for treating the pollutants contained in the exhaust gases of an internal-combustion engine.

It is notably but not exclusively intended for a spark-ignition engine, in particular of gasoline or gas type.

This invention also relates to a method allowing this pollutant treatment plant to be used.

BACKGROUND OF THE INVENTION

The pollutants contained in the exhaust gases of an engine and resulting from the combustion of a fuel mixture are mainly unburnt hydrocarbons (HC), carbon monoxide (CO) and nitrogen oxides (NO and NO2), more commonly referred to as NOx.

In order to comply with environmental standards and to meet the severization of these standards, such as the standards known as EURO V or EURO VI, these pollutants have to be treated prior to discharging the exhaust gases into the atmosphere.

As it is generally known, pollutant post-treatment devices are installed on the exhaust line of vehicles. Thus, HC and CO treatment is achieved through passage of these exhaust gases through a triple-effect oxidation catalyst known as three-way catalyst, by means of which the HC and the CO are oxidized. Furthermore, the NOx are reduced under particular engine running conditions such as operation with a stoichiometric fuel mixture, through passage through this catalyst.

In order to be able to treat the NOx, in cases where the gases are globally oxidizing, these gases also flow through another catalyst, referred to as SCR (Selective Catalytic Reduction) catalyst, which allows to selectively reduce the NOx to nitrogen through the action of a reducing agent. This agent can be ammonia or a compound generating ammonia through decomposition, such as urea, which is generally injected upstream from the SCR catalyst. This ammonia mixes with the exhaust gases, then it reacts with the NOx of the exhaust gases on the SCR catalyst according to several possible chemical reactions.

This agent can also be a hydrocarbon, hydrogen, carbon monoxide, . . . .

As described in particular in document EP-0,758,714, such a plant comprises the exhaust line of an internal-combustion engine on which are installed a three-way oxidation catalyst, means for injecting a reducing agent and a selective catalytic reduction catalyst.

The problem that arises with such a plant is that the three-way catalyst operates only when it has reached its light-off temperature, close to 200° C., with a stoichiometric fuel mixture, and the SCR catalyst is operational with a lean fuel mixture with an operating temperature ranging between 180° C. and 550° C.

This is why there are two exhaust gas circulation channels, as illustrated in the aforementioned document, one comprising the three-way catalyst and the SCR catalyst, and the other circulation channel opening directly onto the inlet of the three-way catalyst.

Besides the fact that this plant is of complicated design and voluminous with two circulation channels, it also requires throttle means associated with control strategies to control circulation of the exhaust gases through one of the channels or the other.

Furthermore, when the channel comprising the SCR catalyst is supplied with exhaust gases, very hot exhaust gases flow through the catalyst and therefore generate a thermal shock. Such a thermal shock can damage it, notably if it is repetitive and more particularly when the SCR catalyst is at ambient temperature.

The present invention aims to overcome the aforementioned drawbacks by means of an exhaust gas treatment plant of simple design and reduced cost.

SUMMARY OF THE INVENTION

The present invention therefore relates to a plant for treating the pollutants contained in the exhaust gases of an internal-combustion engine comprising an exhaust line with an oxidation catalyst, a selective catalytic reduction catalyst including a chemically active porous body and injection means for injecting a reducing agent into said line, characterized in that the selective catalytic reduction catalyst comprises at least one chemically inert passage for the exhaust gases flowing therethrough and in that shut-off means control access of said gases to this passage.

The passage can consist of a channel located in the central area of the body of the selective catalytic reduction catalyst.

The shut-off means can be located upstream from the selective catalytic reduction catalyst, considering the direction of circulation of the exhaust gases.

The shut-off means can comprise a clapper mobile under the action of a control means.

The control means can comprise an actuator such as a jack, an electric motor, . . . .

The exhaust line can successively comprise an exhaust gas inlet, the oxidation catalyst, the reducing agent injection means, the passage shut-off means and the selective catalytic reduction catalyst.

The invention also relates to a method of treating the pollutants contained in the exhaust gases of an internal-combustion engine comprising an exhaust line with an oxidation catalyst, a selective catalytic reduction catalyst including a chemically active porous body and injection means for injecting a reducing agent into said line, characterized in that it consists in controlling the circulation of the exhaust gases through a chemically inert passage in the selective catalytic reduction catalyst.

The method can consist in allowing circulation of the exhaust gases in said passage under stoichiometric or rich engine operating conditions and a high exhaust gas temperature.

The method can consist in preventing circulation of the exhaust gases in said passage under rich engine operating conditions and a low exhaust gas temperature.

The method can consist in preventing circulation of the exhaust gases in said passage under lean engine operating conditions and a high exhaust gas temperature.

Thus, by means of the invention and whatever the configuration selected, it is always possible to maintain a hot gas stream through the SCR catalyst so as to maintain its temperature.

Furthermore, the three-way catalyst located upstream from the SCR catalyst allows to perform oxidation of the NO to NO2 while allowing the efficiency of this SCR catalyst to be increased.

Besides, during engine operating phases at high gas temperature, all or part of the gas can be diverted from the SCR catalyst so as to keep this catalyst at a lower temperature than the limit temperature.

Similarly, during idle or low load phases of the engine, the fact that passage of the exhaust gas stream through the SCR catalyst can be controlled allows to limit the cooling rate of this catalyst.

BRIEF DESCRIPTION OF THE FIGURES

Other features and advantages of the invention will be clear from reading the description given hereafter by way of non limitative example, with reference to the accompanying figures wherein.

DETAILED DESCRIPTION

Figure 1:
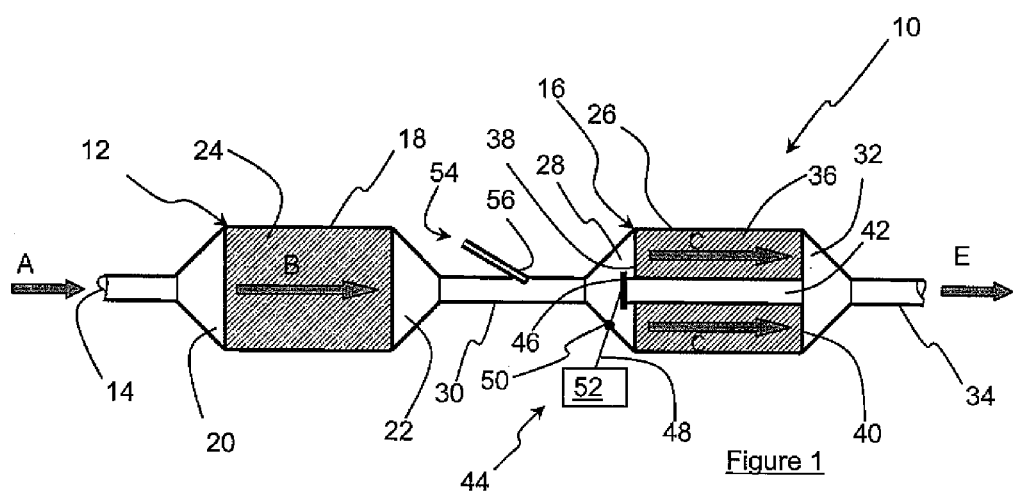
FIG. 1 diagrammatically shows an exhaust gas treatment plant according to the invention in a first operating configuration.

In FIG. 1, the treatment plant comprises an exhaust line 10 allowing to discharge the exhaust gases (arrow A) resulting from the combustion of a fuel mixture and contained in an exhaust manifold (not shown).

This line comprises a three-way oxidation catalyst 12 located as close as possible to exhaust gas inlet 14, followed by a SCR catalyst 16.

As it is well known, three-way catalyst 12 comprises a housing 18, preferably tubular, with an exhaust gas inlet 20 and a gas outlet 22. This housing includes, between the inlet and the outlet thereof, a porous catalytic element 24 through which the exhaust gases flow (arrow B) and can thus be depolluted. This element therefore comprises a substrate (or support) generally made of cordierite or metal, wherein catalytic phases based on precious metals such as palladium, platinum and/or rhodium are deposited.

The purpose of this three-way catalyst is to oxidize the HC and the CO and to reduce the NOx when the engine runs with a stoichiometric fuel mixture.

The SCR catalyst also comprises a tubular housing 26 with an inlet box 28 for gases coming from the three-way catalyst outlet and circulating in an exhaust pipe portion 30 connecting the three-way catalyst outlet to the inlet box. This housing also comprises a gas outlet box 32 connected to another exhaust pipe portion 34 for discharging the depolluted exhaust gases to the atmosphere (arrow E).

The housing contains a porous body 36, preferably a monolith, chemically active for exhaust gases, located between the inlet and the outlet box. This housing comprises a support wherein one or more catalytic reagents such as vanadium, in cases where urea is used, are arranged to act upon the NOx and more particularly the NO2.

The body comprises an inlet face 38 communicating with the inlet box of the housing and an outlet face 40 located in the outlet box of the housing. This body comprises at least one passage, here a channel 42, substantially rectilinear, extending from the inlet face to the outlet face. Advantageously, this channel is arranged in the central area of the body of the SCR catalyst and it comprises no catalytic reagents on its inner peripheral surface so as to make it chemically inert when the gases flow therethrough.

Advantageously, this channel comprises on the inner periphery thereof a thermally insulating coating so as to limit heat transfer between the exhaust gases and the porous body.

As can be better seen in the figure, shut-off means 44 are provided for this channel to allow or prevent access and circulation of the exhaust gases in this channel.

Advantageously, these means are arranged at the inlet of the channel, i.e. at the end of the channel located on the inlet face, but they can be alternatively arranged at the outlet of the channel, i.e. at the end of the channel located on the outlet face of the body.

By way of example, these shut-off means comprise a mobile clapper 46 arranged opposite the channel inlet and brought into articulation by an end of a link 48 articulated around a rotation pin 50, preferably arranged on the peripheral wall of inlet box 28. The other end of this link is subjected to a control means 52 allowing tilting of this link around this pin 50. This control means, which can be a (hydraulic, electrohydraulic, . . . ) jack, an electric motor or any other actuator, is controlled by the engine calculator according to engine operating parameters such as the fuel/air ratio and/or the exhaust gas temperature.

The exhaust line also comprises injection means 54 for injecting a reducing agent for the SCR catalyst, urea here.

These injection means include a urea injector 56 connected to an injection circuit (pump, tank, . . . ) and arranged on the exhaust pipe portion 30 upstream from this catalyst (considering the direction of circulation of the exhaust gases as illustrated by arrow A). This injector is placed on the pipe in such a way that its nozzle opens into pipe 30 so as to spray the reducing agent towards inlet box 28 of the SCR catalyst.

Thus, within the scope of a first embodiment of the plant as illustrated in FIG. 1, clapper 46 is in a position where circulation channel 42 is closed under the action of link 48 and of control means 52.

The temperature of the exhaust gases reaching inlet 14 of the exhaust line is considered to be below a threshold allowing the SCR catalyst to be made operational but sufficient to reach the light-off temperature of the three-way catalyst.

In this configuration, the exhaust gases flow through the three-way catalyst (arrow B) between the inlet 20 and the outlet 22 thereof. The pollutants (HC, CO) contained in these gases are then treated as they flow through the catalyst. Thus, these pollutants are essentially converted to CO2 (carbon dioxide) and H2O (water).

These gases then flow through pipe portion 30 where the urea injector is inactive and they end in inlet box 28 of the SCR catalyst.

Since the inlet of channel 42 is closed by clapper 46, these gases flow through active body 36 (arrow C) all around this channel and end in outlet box 32 communicating with the other exhaust pipe portion 34 where they are discharged to the atmosphere (arrow E).

As they flow through the SCR catalyst, and considering the relatively low temperature of these gases, the pollutants contained in the gases are not chemically treated by the SCR catalyst. However, passage of the gases through body 36 allows the heat they carry to be transmitted to this body so as to raise its temperature to the temperature level of these gases.

This has the advantage of progressively increasing the temperature of body 36 up to the maximum efficiency temperature of the SCR catalyst without generating thermal shocks.

Figure 2:
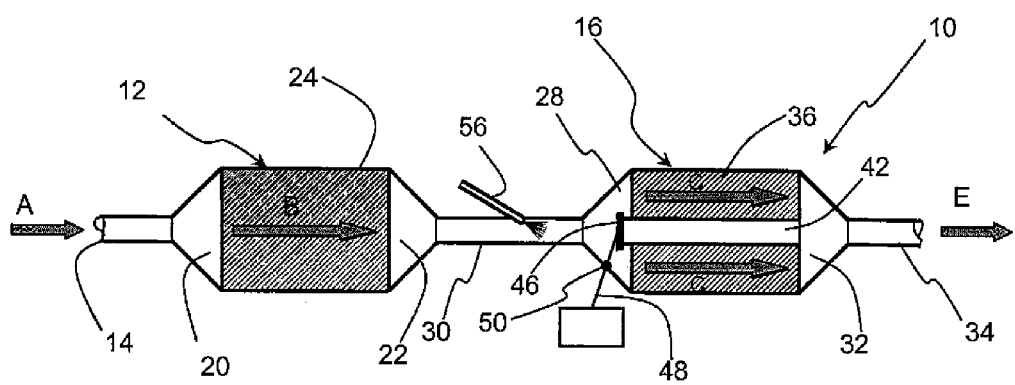
FIG. 2 shows the plant of FIG. 1 in a second operating configuration.

In the configuration of FIG. 2, the exhaust gases reach inlet 14 of the exhaust line with a temperature that can range between 200° C. and 700° C. This temperature is sufficient to make both the three-way catalyst and the SCR catalyst operational, but it is below a critical threshold likely to destroy the SCR catalyst (approximately 650° C.).

In this case, the reducing agent injector 56 is active and it allows urea to be injected into pipe portion 30. This urea, under the effect of the heat of the exhaust gases, decomposes into an ammonia-containing element necessary for SCR catalysis.

This configuration is generally used when the engine runs with a lean mixture and when the exhaust gases make up an oxidizing mixture.

In this layout, the exhaust gases flow, as described above, through the three-way catalyst (arrow B) between inlet 20 and outlet 22 with treatment of the pollutants (HC, CO and NOx) contained in these gases and conversion to CO2, H2O and NO2.

Upon contact with the hot exhaust gases circulating in exhaust pipe portion 30, the urea is essentially decomposed into ammonia (NH3) that is allowed with the gases into inlet box 28 of the SCR catalyst.

As in the example of FIG. 1, clapper 46 shuts off the inlet of channel 42 and the mixture of exhaust gas and of ammonia flows through porous body 36 around channel 42. During this flow, the NO2 contained in the exhaust gases react chemically with the catalytic phases of the catalyst and they are mainly converted to nitrogen (N2).

These depolluted gases then reach outlet box 32 of the SCR catalyst from where they are discharged to the atmosphere through other pipe portion 34.

Figure 3:
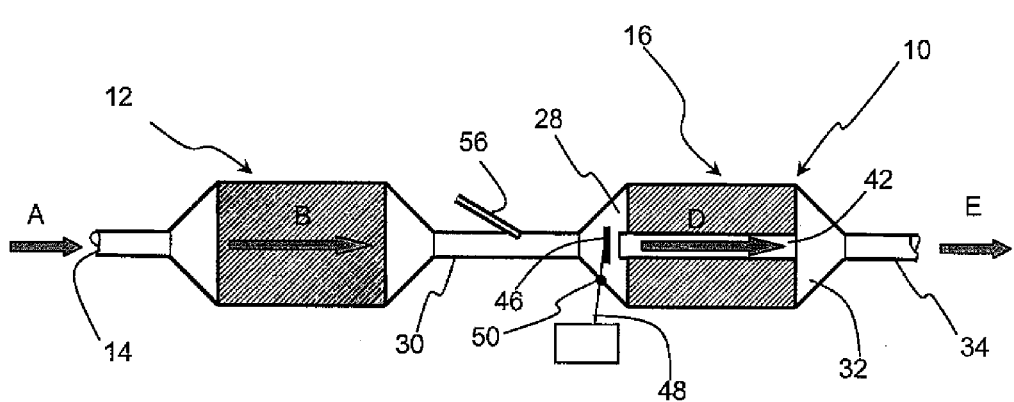
FIG. 3 shows this plant in another operating configuration.

In the illustration of FIG. 3, the temperature of the exhaust gases that reach inlet 14 of the exhaust line is at such a level that it might damage or even destroy the SCR catalyst. Furthermore, considering this high temperature, this SCR catalyst cannot reduce the pollutants (NO2) flowing therethrough.

The displacement of clapper 46 is also controlled through the rotation of link 48 around pin 50 by thus clearing the inlet of channel 42 and urea injector 56 is made inactive.

The exhaust gases that have flowed through the three-way catalyst end in exhaust pipe portion 30, then in inlet box 28 of the SCR catalyst.

These gases flow then through body 36 using the easiest way, i.e. more precisely the way free from any hindrance, of channel 42 (arrow D) that has been dimensioned accordingly. As this channel is free of any catalytic reagent since it is a chemically inert channel, the exhaust gases are not treated and they reach outlet box 32 prior to being sent to the other exhaust pipe portion 34.

The very hot gases can therefore not damage the body of the SCR catalyst, but they however transmit some heat to this body so as to maintain its temperature until the next use.

It is clear that the temperature of the gases can be either evaluated by the engine calculator, from various engine operating parameters (fuel flow rate, intake pressure, . . . ), or directly measured by any means such as a temperature detector preferably located upstream from the SCR catalyst.

The table hereafter sums up the various positions of clapper 46 and the activation of the SCR catalyst according to the engine load, the fuel/air ratio of this engine and the exhaust gas temperature.

| Engine | Exhaust gas temperature | Fuel/air ratio | Clapper | Reducing agent injection |
| --- | --- | --- | --- | --- |
| Low load | Cold | 1 | Closed | No |
| Medium load | Cold | 1 | Closed | No |
| High load | Cold | 1 | Closed | No |

-continued

| Engine | Exhaust gas temperature | Fuel/air ratio | Clapper | Reducing agent injection |
| --- | --- | --- | --- | --- |
| Low load | Hot | 1 | Open | No |
| Medium load | Hot | lean | Closed | Yes |
| High load | Hot | >=1 | Open | No |

It can be observed from this table that, for engine operating conditions such as a stoichiometric or a rich fuel mixture, and whatever the engine load associated with a low exhaust gas temperature, i.e. insufficient to activate the SCR catalyst, clapper 46 thus is in a position where channel 42 is closed and urea injector 56 is inactive.

The exhaust gases flow through the body of the SCR catalyst without being depolluted but they are used to contribute to the temperature rise of this catalyst or to maintain the temperature of this body.

On the other hand, when the gases are hot (whatever the temperature level of the gases) and when the engine runs with a fuel/air ratio equal to or greater than 1 with a low or a high load, the urea injector is always inactive and the clapper is in a position where channel 42 is open.

The exhaust gases then circulate only in channel 42 while transmitting through heat conduction their heat to the body of the catalyst so as to maintain its temperature.

If the temperature of the exhaust gases leaving the three-way catalyst is sufficient to activate the SCR catalyst and to achieve depollution of the exhaust gases, the engine is then in a lean operating mode with a medium load. The clapper is then controlled so as to shut off the inlet of channel 42 and urea is injected into channel portion 30.

The pollutants contained in the exhaust gases as they flow through the body are thus converted to a harmless product after being treated by the SCR catalyst.

The present invention is not limited to the examples described above and it encompasses any variant or equivalent.

Notably, the plant described can be used for diesel type internal-combustion engines with operating phases under stoichiometric conditions.

The invention claimed is:

1. A plant for treating pollutants contained in exhaust gases of an internal-combustion engine comprising an exhaust line with an oxidation catalyst, a selective catalytic reduction catalyst including a chemically active porous body and injection means for injecting a reducing agent into the line, characterized in that the selective catalytic reduction catalyst comprises at least one chemically inert passage for the exhaust gases flowing therethrough and in that shut-off means control access of the gases to this passage.

2. The plant for treating the pollutants contained in the exhaust gases as claimed in claim 1, characterized in that the passage comprises a channel located in a central area of the body of the selective catalytic reduction catalyst.

3. The plant for treating the pollutants contained in the exhaust gases as claimed in claim 1, characterized in that the shut-off means are located upstream from the selective catalytic reduction catalyst, considering a direction of circulation of the exhaust gases.

4. The plant for treating the pollutants contained in the exhaust gases as claimed in claim 1, characterized in that the shut-off means comprise a clapper that is mobile under the action of a control means.

5. The plant for treating the pollutants contained in the exhaust gases as claimed in claim 4, characterized in that the control means comprise an actuator, a jack or an electric motor.

6. The plant for treating the pollutants contained in the exhaust gases as claimed in claim 1, characterized in that the exhaust line successively comprises an exhaust gas inlet, the oxidation catalyst, the reducing agent injection means, the passage shut-off means and the selective catalytic reduction catalyst.

7. A method of treating pollutants contained in exhaust gases of an internal-combustion engine comprising an exhaust line with an oxidation catalyst, a selective catalytic reduction catalyst and injection means for injecting a reducing agent into the line, characterized in that it comprises controlling circulation of the exhaust gases through a chemically inert passage in the selective catalytic reduction catalyst.

8. The method of treating the pollutants contained in the exhaust gases as claimed in claim 7, characterized in that it comprises allowing circulation of the exhaust gases in the passage under stoichiometric or rich engine operating conditions and a high exhaust gas temperature.

9. The method of treating the pollutants contained in the exhaust gases as claimed in claim 7, characterized in that it comprises preventing circulation of the exhaust gases in the passage under rich engine operating conditions and a low exhaust gas temperature.

10. The method of treating the pollutants contained in the exhaust gases as claimed in claim 7, characterized in that it comprises preventing circulation of the exhaust gases in the passage under lean engine operating conditions and a high exhaust gas temperature.

11. The plant for treating the pollutants contained in the exhaust gases as claimed in claim 1, further comprising a controller comprising an actuator controlled by an engine calculator, the controller being configured to actuate the shut-off means in a first mode wherein the at least one chemically inert passage is closed and the exhaust gases pass through the selective catalytic reduction catalyst, a second mode wherein the at least one chemically inert passage is closed while the injection means inject the reducing agent into the line and the exhaust gases pass through the selective catalytic reduction catalyst, and a third mode wherein the at least one chemically inert passage is open and the exhaust gases pass only through the at least one chemically inert passage.

12. The method of treating the pollutants contained in the exhaust gases as claimed in claim 7, wherein controlling circulation of the exhaust gases through a chemically inert passage in the selective catalytic reduction catalyst includes a first mode wherein the chemically inert passage is closed and the exhaust gases pass through the selective catalytic reduction catalyst, a second mode wherein the chemically inert passage is closed while the injection means inject the reducing agent into the line and the exhaust gases pass through the selective catalytic reduction catalyst, and a third mode wherein the chemically inert passage is open and the exhaust gases pass only through the chemically inert passage.

13. A plant for treating pollutants contained in exhaust gases of an internal-combustion engine comprising:
an exhaust line with an oxidation catalyst;
a selective catalytic reduction catalyst including a chemically active porous body and injection means for injecting a reducing agent into the line, wherein an inlet to the selective catalytic reduction catalyst is in communication with an outlet of the oxidation catalyst;
at least one chemically inert passage disposed within the selective catalytic reduction catalyst and configured to allow exhaust gases to flow through the selective catalytic reduction catalyst; and
shut-off means that control access of the gases to the passage.

14. The plant for treating the pollutants contained in the exhaust gases according to claim 13, wherein the passage comprises a channel located in a central area of the body of the selective catalytic reduction catalyst.

15. The plant for treating the pollutants contained in the exhaust gases according to claim 13, wherein the shut-off means are located upstream from the selective catalytic reduction catalyst, considering a direction of circulation of the exhaust gases.

16. The plant for treating the pollutants contained in the exhaust gases according to claim 13, wherein the shut-off means comprise a clapper that is mobile under the action of a control means.

17. The plant for treating the pollutants contained in the exhaust gases according to claim 16, wherein the control means comprise an actuator, a jack or an electric motor.

18. The plant for treating the pollutants contained in the exhaust gases according to 13, wherein the exhaust line successively comprises an exhaust gas inlet, the oxidation catalyst, the reducing agent injection means, the passage shut-off means and the selective catalytic reduction catalyst.

19. The plant for treating the pollutants contained in the exhaust gases according to claim 13, further comprising a controller comprising an actuator controlled by an engine calculator, the controller being configured to actuate the shut-off means in a first mode wherein the at least one chemically inert passage is closed and the exhaust gases pass through the selective catalytic reduction catalyst, a second mode wherein the at least one chemically inert passage is closed while the injection means inject the reducing agent into the line and the exhaust gases pass through the selective catalytic reduction catalyst, and a third mode wherein the at least one chemically inert passage is open and the exhaust gases pass only through the at least one chemically inert passage.

* * * * *